United States Patent
Lin

(10) Patent No.: US 8,959,857 B1
(45) Date of Patent: Feb. 24, 2015

(54) SINGLE-PIECE STANDOFF POST BASE FOR RETROFIT

(71) Applicant: Simpson Strong-Tie Company, Inc., Pleasanton, CA (US)

(72) Inventor: Jin-Jie Lin, Livermore, CA (US)

(73) Assignee: Simpson Strong-Tie Company, Pleasanton, CA (US)

( * ) Notice: Subject to any disclaimer, the term of this patent is extended or adjusted under 35 U.S.C. 154(b) by 0 days.

(21) Appl. No.: 14/155,371

(22) Filed: Jan. 15, 2014

(51) Int. Cl.
*E04H 12/22* (2006.01)
*F16B 5/02* (2006.01)
*E04B 1/38* (2006.01)

(52) U.S. Cl.
CPC .... *F16B 5/02* (2013.01); *E04B 1/38* (2013.01)
USPC .......... 52/296; 52/297; 52/298; 52/712; 52/745.21; 256/65.14

(58) Field of Classification Search
CPC .......... E04B 1/2608; E04B 2011/3684; E04H 12/2253; E04H 12/2261; E04H 12/2269
USPC .......... 52/296–298, 708, 712, 715, 745.21; 248/300, 519, 530, 534, 539; 29/525.11; 256/65.14
See application file for complete search history.

(56) References Cited

U.S. PATENT DOCUMENTS

| | | |
|---|---|---|
| 1,699,557 A | 1/1929 | Yeager |
| 1,791,135 A * | 2/1931 | Kummer ................ 52/707 |
| 1,816,226 A | 7/1931 | Krabiel |
| 2,182,579 A | 12/1939 | Birch |
| 2,191,979 A | 2/1940 | Bierbach |
| 2,666,238 A | 1/1954 | Hagedorn |
| 3,000,145 A | 9/1961 | Fine |
| 3,630,474 A | 12/1971 | Miner |
| 3,727,358 A * | 4/1973 | Howell ................ 52/169.1 |
| 3,884,008 A * | 5/1975 | Miller ................ 52/699 |
| 4,096,677 A | 6/1978 | Gilb |
| 4,199,908 A | 4/1980 | Teeters |
| 4,614,070 A | 9/1986 | Idland |
| 4,958,470 A | 9/1990 | Han et al. |
| 4,995,206 A | 2/1991 | Colonias et al. |
| 5,143,472 A | 9/1992 | Reed et al. |
| 5,307,603 A | 5/1994 | Chiodo |
| 5,333,435 A * | 8/1994 | Leek ................ 52/704 |

(Continued)

FOREIGN PATENT DOCUMENTS

| | | |
|---|---|---|
| AU | 103929 A | 5/1938 |
| DE | 481224 C | 8/1929 |

(Continued)

OTHER PUBLICATIONS

"Wood Construction Connectors", Simpson Strong-Tie Catalog C-98, Jan. 1998, 4 pages including cover, back, and pp. 24, 26, Simpson Strong Tie Company, Inc., USA.

(Continued)

*Primary Examiner* — Robert Canfield
(74) *Attorney, Agent, or Firm* — James R. Cypher; Charles R. Cypher

(57) ABSTRACT

A post to foundation connection made with a connector that can be installed as a retrofit after the post is already in place, with fastener attachments that are made to either side of the post rather than under it. The connector can be slid into place below the post, between it and the foundation, after which it can be attached to the foundation and the post.

14 Claims, 8 Drawing Sheets

(56) References Cited

U.S. PATENT DOCUMENTS

| | | | |
|---|---|---|---|
| 5,375,384 A * | 12/1994 | Wolfson | 52/295 |
| D364,334 S | 11/1995 | Sandstrom et al. | |
| 5,548,939 A | 8/1996 | Carmical | |
| D399,013 S | 9/1998 | Nguyen | |
| D470,952 S | 2/2003 | Krause | |
| 6,513,290 B2 | 2/2003 | Leek | |
| 6,668,508 B2 | 12/2003 | Boone | |
| 6,718,698 B1 | 4/2004 | Thompson | |
| 6,840,020 B2 | 1/2005 | Leek | |
| 7,296,386 B2 | 11/2007 | Leek et al. | |
| 7,461,493 B2 * | 12/2008 | Quertelet et al. | 52/712 |
| 7,513,083 B2 | 4/2009 | Pryor | |
| D610,717 S * | 2/2010 | Lin | D25/133 |
| 8,555,580 B2 | 10/2013 | Vilasineekul | |
| 8,584,413 B1 | 11/2013 | Keller, Sr. | |
| D703,029 S * | 4/2014 | Fox | D8/373 |
| 2006/0032165 A1 * | 2/2006 | Griffith | 52/298 |
| 2006/0037265 A1 | 2/2006 | Leek | |
| 2007/0267552 A1 * | 11/2007 | Meyer | 248/156 |
| 2012/0006964 A1 * | 1/2012 | Bergman | 248/523 |

FOREIGN PATENT DOCUMENTS

| | | |
|---|---|---|
| EP | 2085540 A2 | 8/2009 |
| GB | 303436 A | 1/1929 |
| GB | 453059 A | 9/1936 |
| JP | 10159289 A | 6/1998 |
| WO | WO 9721010 A | 6/1997 |
| WO | WO 2010073234 A1 | 7/2010 |

OTHER PUBLICATIONS

"Construction Hardware", Southeastern Metals Catalog, 1991, 3 pages including cover, back and p. 38. Southeastern Metals Manufacturing Co., Inc., Jacksonville, FL, USA.

* cited by examiner

SINGLE-PIECE STANDOFF POST BASE FOR RETROFIT

BACKGROUND

This invention relates to a connection for supporting a wood post above the top surface of a concrete foundation and for securing the post to embedded anchors in the concrete foundation to provide resistance to upward movement of the post relative to the concrete foundation. Forces which could cause upward movement of the wood post include earthquakes, hurricanes, typhoons, high winds and tidal or wave forces. This invention further relates specifically to connections which are installed after the concrete foundation has hardened, and further to retrofit connections made by slipping the connector between the bottom of the post and the upper surface of the concrete.

There are several types of sheet metal connectors commercially available for providing the connection described above. None, however, have been found which provide the necessary resistance to uplift, are formed from a single piece of sheet metal, and permit retrofitting of existing connections.

SUMMARY OF THE INVENTION

The present connection is a post to foundation connection made with a connector that can be installed as a retrofit after the post is already in place, with fastener attachments that are made to either side of the post rather than under it. The connector can be slid into place below the post, between it and the foundation, after which it can be attached to the foundation and the post.

The present invention includes a connector that attaches to the sides of the post, which is also suitable for in situ attachment to the post, as opposed to connectors that fasten to the bottom surface of the post. The upright arms that fasten to the sides of the post can be joined by fasteners that pass through the post and both arms for the strongest possible attachment.

The present invention includes a standoff connector that is essentially a particularly strong, compact box underneath the post. The connector has side leg members that are folded in under the base of the connector to support it on their upper edges while the lower edges can bear down on the upper support surface of the foundation.

The present invention includes a connector that can be formed from sheet metal on progressive die stamping machinery at minimal cost. The connector is less expensive to manufacture, less expensive to store in inventory, has no problem of missing parts at the retail distribution level, and is less expensive to install by virtue of the fact that the installer is never looking for a missing part. The connector consists of a single part bent from a single piece of sheet metal yet is capable of providing greater gravity load support while also providing greater resistance to uplift forces.

The present invention includes a connector that fits under the post except for the portions that are directly attached to the foundation, in order to maximize bearing strength and minimize material use. The portions that are directly attached to the foundation, the feet, are no wider than the post, also minimizing material use and making the connection as compact as possible.

The present invention provides a connection that may be inspected after the installation has been completed to determine whether the nut and washer have been properly installed on the threaded end of the anchor bolt.

DETAILED DESCRIPTION OF THE INVENTION

Figure 1:
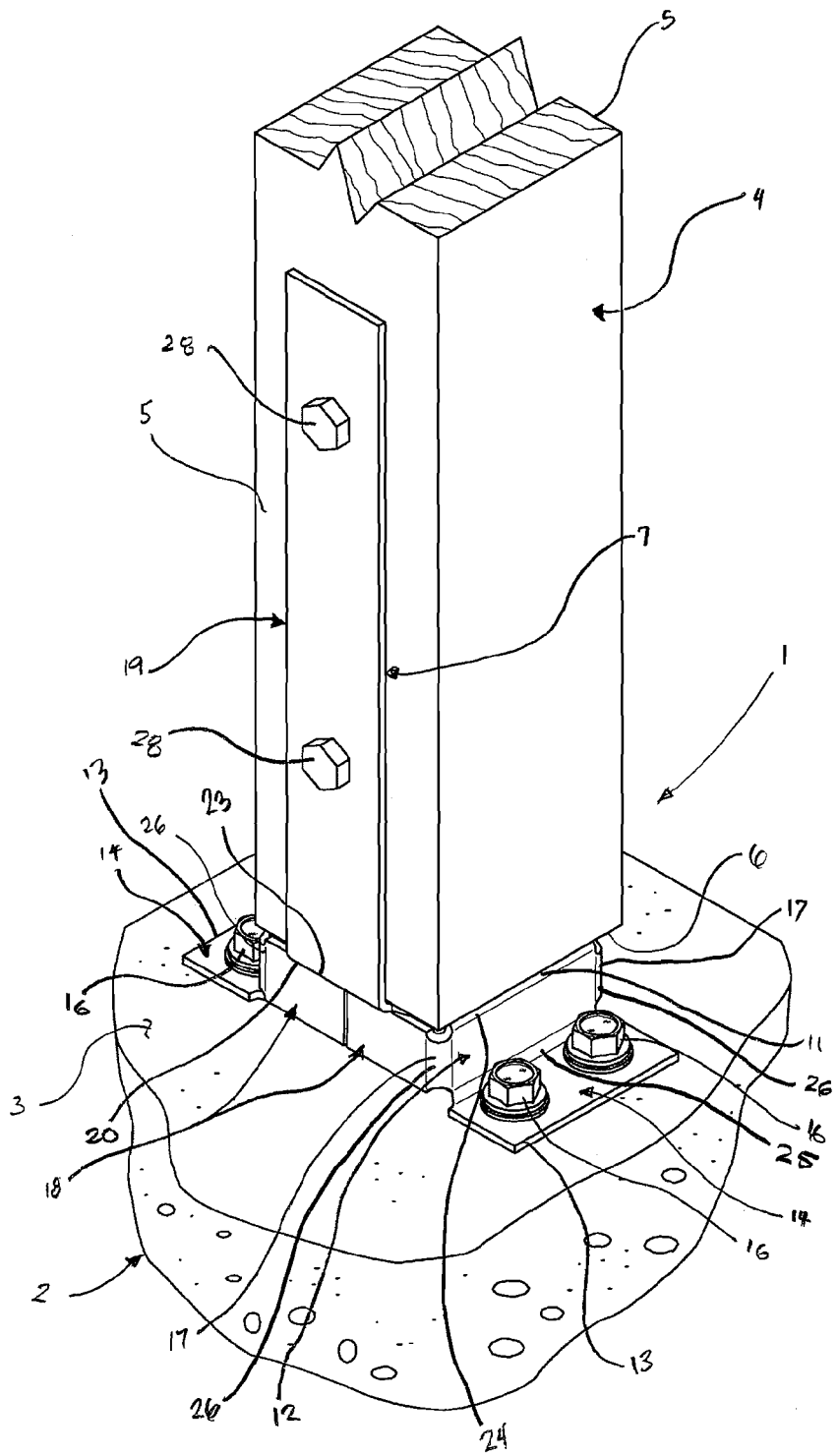
FIG. 1 is a perspective view of the assembled post to foundation connection of the present invention.
Figure 4:
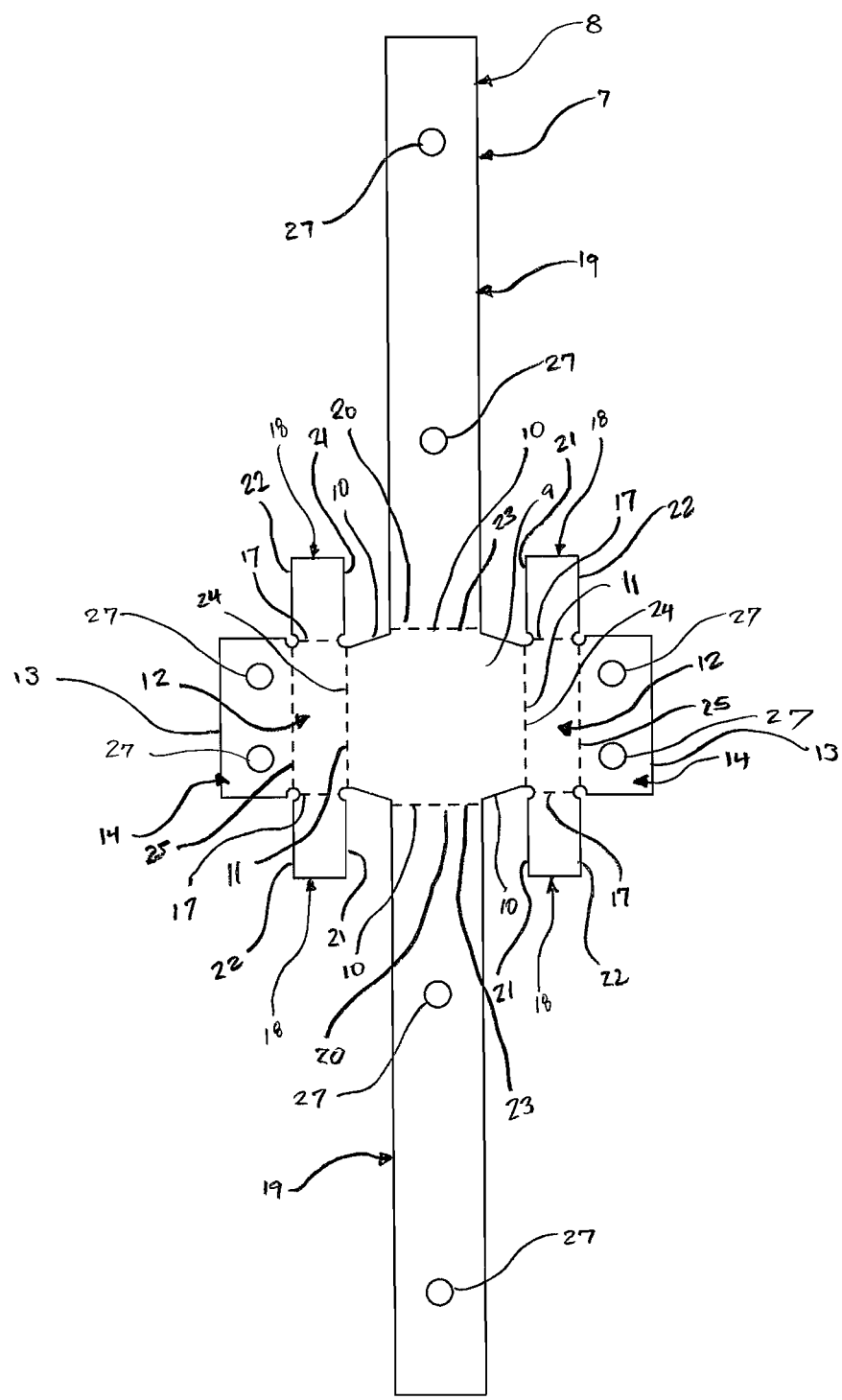
FIG. 4 a top plan view of the unfolded sheet metal blank of the connector of the present invention.
Figure 5:
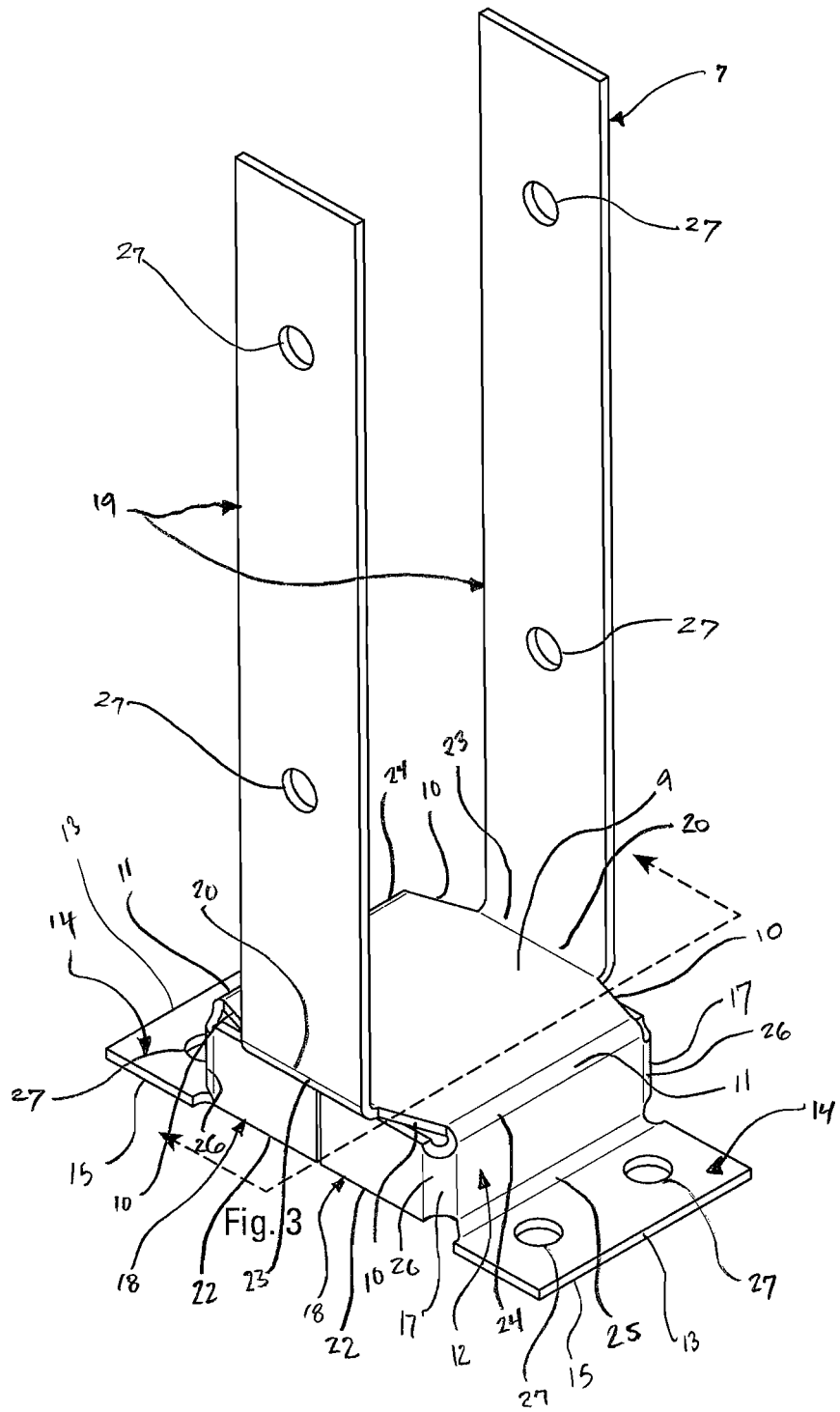
FIG. 5 is a perspective view of the connector of the present invention.
Figure 6:
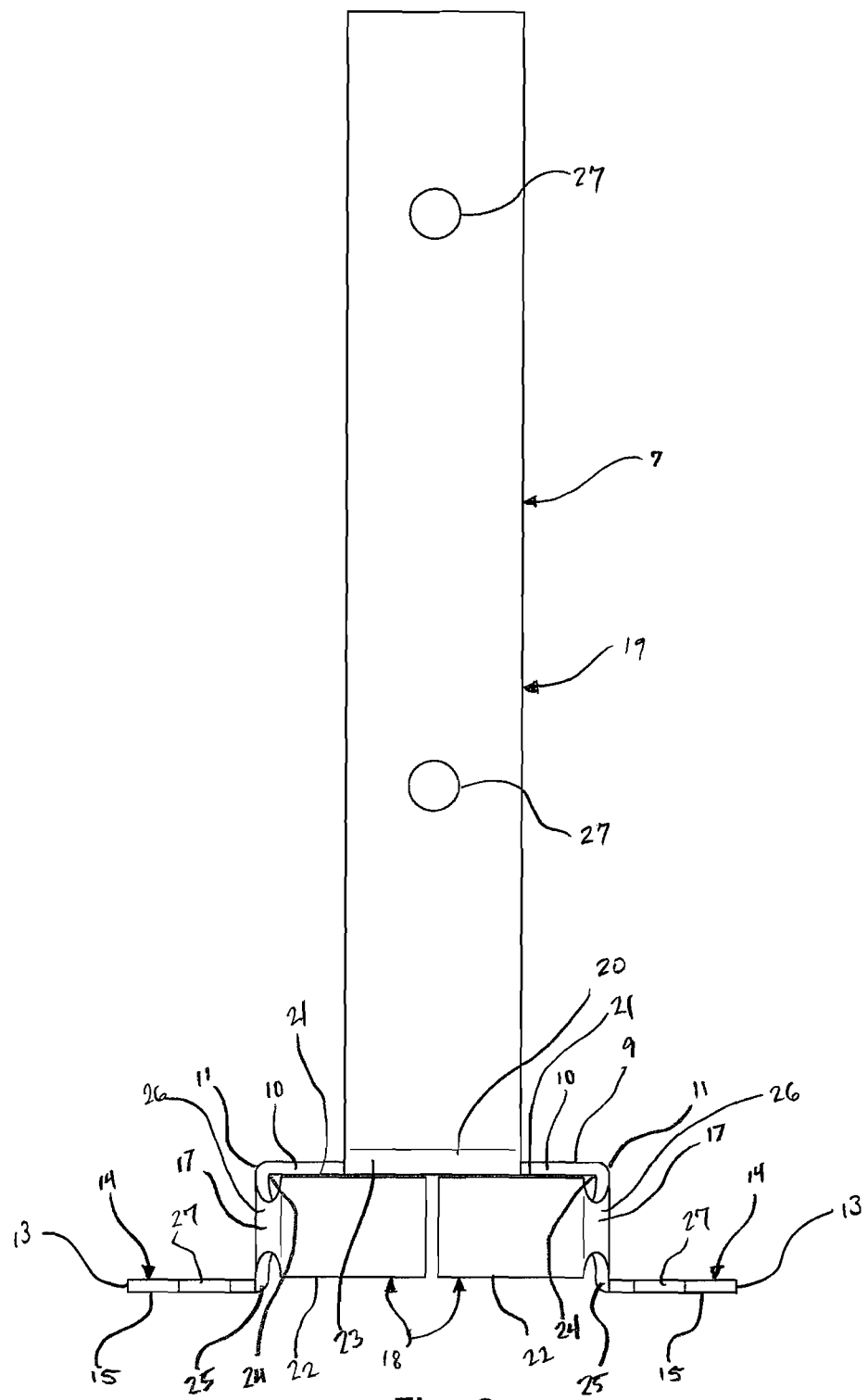
FIG. 6 is a side elevation view of the connector illustrated in FIG. 5.
Figure 7:
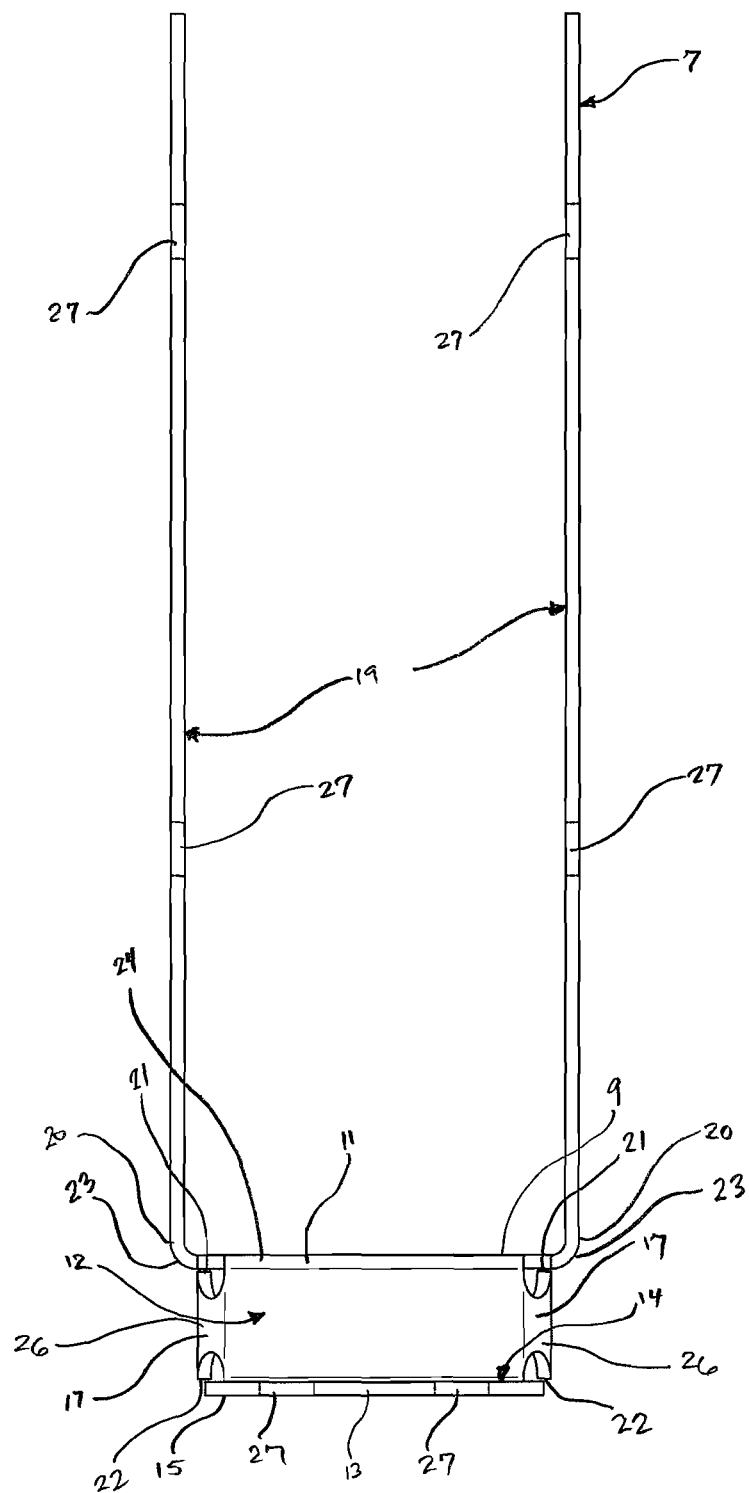
FIG. 7 is a front elevation view of the connector illustrated in FIG. 5.
Figure 8:
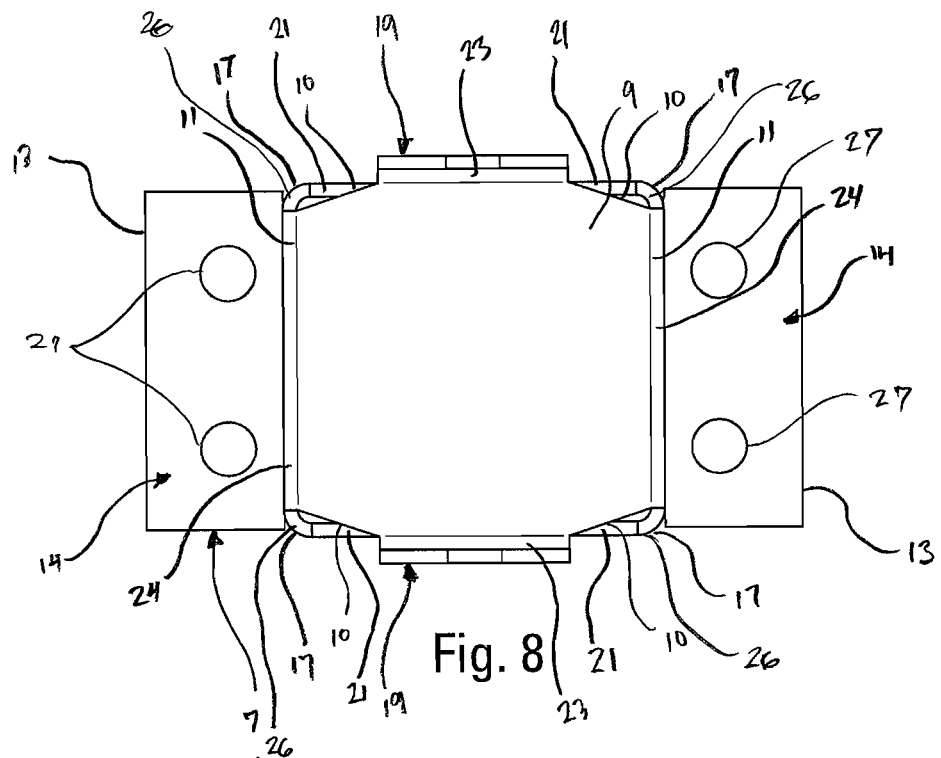
FIG. 8 is a top plan view of the connector illustrated in FIG. 5.
Figure 9:
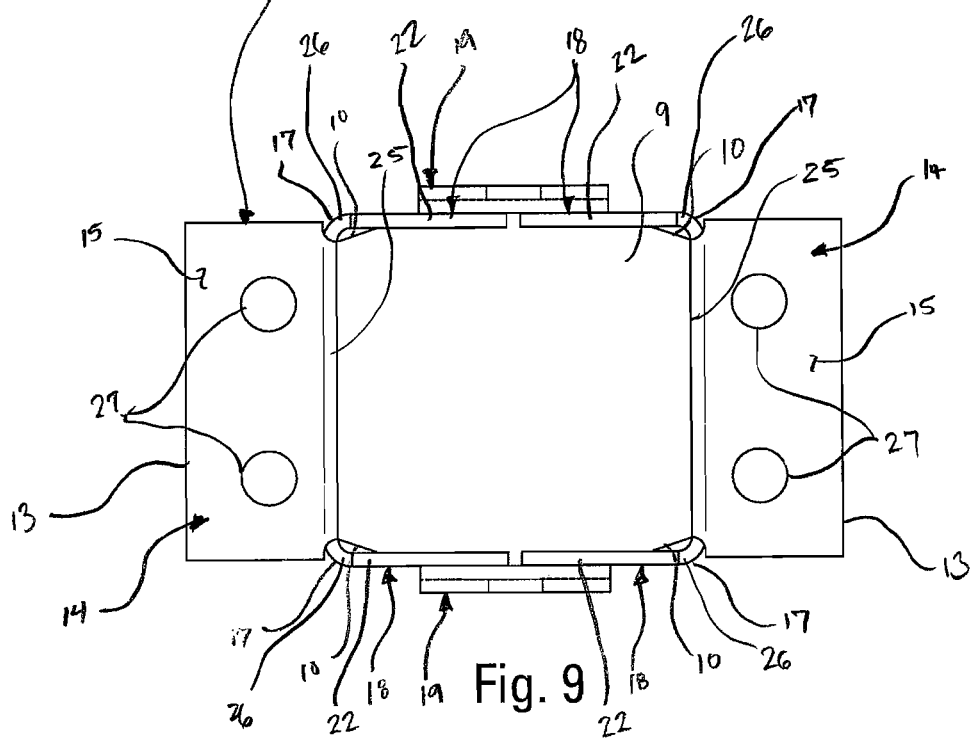
FIG. 9 is a bottom plan view of the connector illustrated in FIG. 5.

As shown in FIG. 1, the present invention is a post to foundation connection 1. The connection 1 preferably comprising a concrete foundation 2 with an upper support surface 3, an elongated structural member 4 mounted in an upright orientation above the foundation 2, and a unitary foundation connector 7. Preferably, the elongated structural member 4 as first and second sides 5 that occupy parallel vertical planes and a base 6 that joins the first and second sides 5 at their lowest extremities and that occupies a horizontal plane. The elongated structural member 4 is preferably a post 4. As shown in FIG. 4, the connector 7 is preferably formed from a sheet metal blank 8 of uniform thickness.

Figure 2:
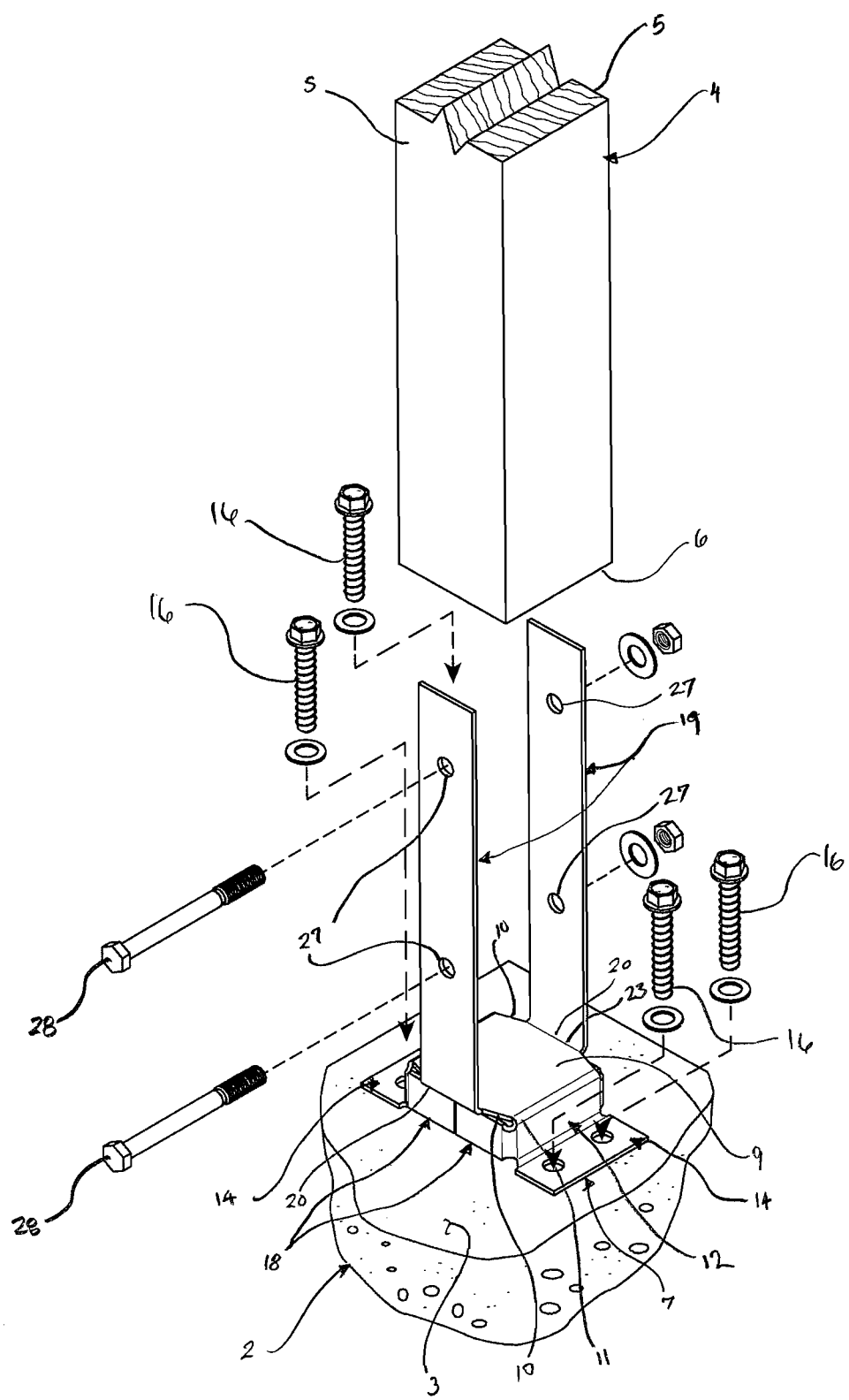
FIG. 2 is a perspective view of the disassembled post to foundation connection illustrated in FIG. 1
Figure 3:
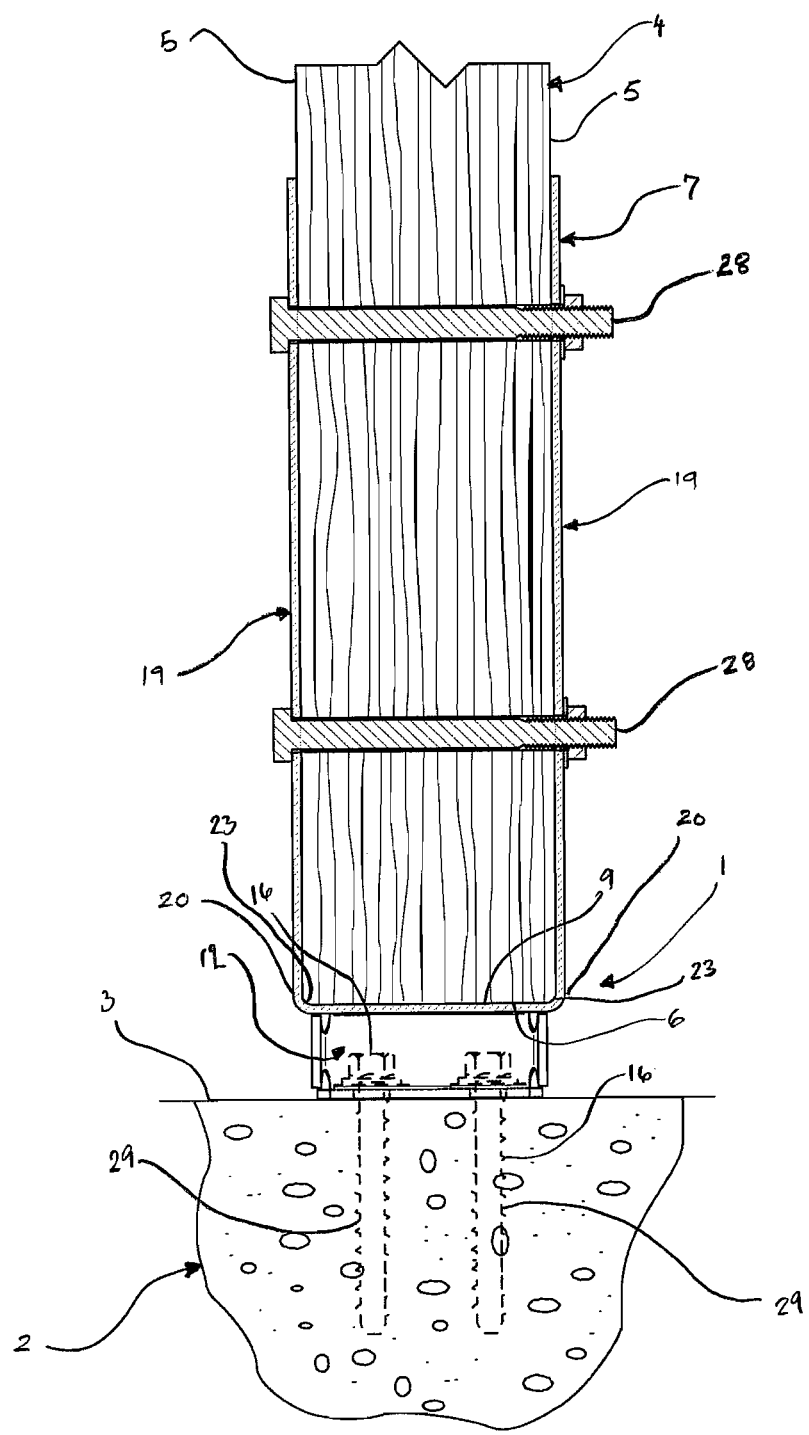
FIG. 3 is a cross-sectional side elevation view of the post to foundation connection illustrated in FIG. 1 taken along view line FIG. 3 in FIG. 5.

As shown in FIGS. 1-3, preferably the connector 7 has a base member 9 that is disposed in registration with the base 6 of the elongated structural member 4, underneath the elongated structural member 4. The base member 9 preferably has horizontally separated first and second side edges 10 and horizontally separated first and second end borders 11.

As shown in FIGS. 1-3, preferably the connector 7 has first and second end leg members 12 that are angularly joined to the first and second end borders 11, respectively, of the base member 9. The first and second end leg members 12 are preferably disposed in a generally upright orientation. Preferably, the first and second end leg members 12 each have horizontally separated substantially vertical first and second side leg extension borders 17.

As shown in FIGS. 1-3, the connector 7 preferably has first and second end foot members 14 that are angularly joined to and splayed outward from the first and second end leg members 12, respectively. Preferably, each of the first and second end foot members 14 has a lower surface 15 that registers with the upper support surface 3 of the concrete foundation. Each of the first and second foot members 14 is preferably fastened to the concrete foundation 2 with one or more separate anchoring fasteners 16.

As shown in FIGS. 1-3, preferably the connector has first and second side legs 18 that are angularly joined respectively to the first and second side leg extension borders 17 of the first end leg member 12 and that are disposed in a generally upright orientation and at least partially under the base member 9 between the base member 9 and the upper support surface 3 of the concrete foundation 2. The connector preferably has third and fourth side legs 18 that are angularly joined respectively to the first and second side leg extension borders 17 of the second end leg member 12 and that are disposed in a generally upright orientation and at least partially under the base member 9 between the base member 9 and the upper support surface 3 of the concrete foundation 2.

As shown in FIGS. 1 and 2, preferably, the connector 7 has first and second post connection members 19. The first and second post connection members 19 preferably have first and second lower ends 20 that are angularly joined to the base member 9 along the first and second side edges 10, respectively, and that are disposed upwardly in registration with the first and second sides 5 of the elongated structural member 4, respectively, and that are fastened thereto. The connector 7 is connected to the elongated structural member 4, or post 4, in order to transfer tension loads from the post 4 into the foundation 2 to resist uplift forces acting on the post 4 and the structure of which it is a part.

As shown in FIGS. 5-9, preferably the first and second end leg members 12 are joined at right angles to the first and second end borders 11, respectively, of the base member 9. The first and second end foot members 14 are preferably joined at right angles to the first and second end leg members 12, respectively. Preferably, the first and second side legs 18 are joined at right angles to the first end leg members 12, respectively. The third and fourth side legs 18 are preferably joined at right angles to the first and second side leg extension borders 17, respectively, of the second end leg member 12. Preferably, the first and second post connection members 19 are joined at right angles to the first and second side edges 10, respectively, of the base member 9.

As shown in FIGS. 5-9, the first and second side legs 18 preferably have first and second upper edges 21, respectively, and vertically separated first and second lower edges 22, respectively. Preferably, the third and fourth side legs 18 have third and fourth upper edges 21, respectively, and vertically separated third and fourth lower edges 22, respectively. The base member 9 is preferably supported by the first and third upper edges 21, respectively, of the first and third side legs 18 adjacent the first lower end 20 of the first post connector 19. Preferably, the base member 9 is also supported by the second and fourth lower edges 21, respectively, of the second and fourth side legs 18 adjacent the second lower end 20 of the second post connector 19.

As shown in FIGS. 1 and 2, the first and second lower edges 22 of the first and second side legs 18, respectively, can bear on the upper support surface 3 of the concrete foundation 2. The third and fourth lower edges 22 of the third and fourth side legs 18, respectively, can also bear on the upper support surface 3 of the concrete foundation 2.

As shown in FIGS. 5-9, the first lower end 20 of the first side connection member 19 is preferably connected to the base member 9 at a first lower end bend line 23 that is substantially parallel and closely adjacent to the first and third upper edges 21, respectively, of the first and third side legs 18. Preferably, the second lower end 20 of the second side connection member 19 is connected to the base member 9 at a second lower bend line 23 that that is substantially parallel and closely adjacent to the second and fourth lower edges 21, respectively, of the second and fourth side legs 18.

As shown in FIGS. 5-9, the first and second end leg members 12 are preferably joined to the first and second end borders 11, respectively, of the base member 9 at first and second end leg bends 24, respectively. Preferably, the first and second end foot members 14 are joined to the first and second inner foot border members 13, respectively, of the first and second end leg members 12 at first and second end foot bends 25, respectively. The first and second side legs 18 are preferably joined to the first and second side leg extension borders 17, respectively, of the first end leg member 12 at first and second side leg bends 26, respectively. Preferably, the third and fourth side legs 18 are joined to the first and second side leg extension borders 17, respectively, of the second end leg member 12 at third and fourth side leg bends 26, respectively. The first and second post connection members 19 are preferably joined to the first and second side edges 10, respectively, of the base member 9 at first and second lower end bends 23, respectively.

As seen in FIG. 3, preferably the first and second side connection members 19 are connected by one or more fasteners 28 that pass through the elongated structural member 4.

As shown in FIG. 1, the greater part of the base member 9 of the unitary foundation connector 7 preferably is flat, and the base 6 of the elongated structural member 2 completely covers the flat part of the base member 9 of the unitary foundation connector 7. Preferably, the greater part of the base member 9 of the unitary foundation connector 7 is flat and is not in registration with the upper support surface 3 of the concrete foundation 2.

As shown in FIGS. 1 and 3, the first end foot member 14 preferably has a first outer edge 13 horizontally separated from the first end border 11 of the base member 9. Preferably, the second end foot member 14 has a second outer edge 13 horizontally separated from the second end border 11 of the base member 9. The first outer edge 13 of the first end foot member 14 preferably is no longer than the distance between the first and second sides 5 of the elongated structural member 4. Preferably, the second outer edge 13 of the second end foot member 14 is no longer than the distance between the first and second sides 5 of the elongated structural member 4.

As shown in FIGS. 1 and 2, each of the first and second end foot members 14 is preferably fastened to the concrete foundation 2 with two anchoring fasteners 16.

The present invention includes a method of making a post to foundation connection 1. Preferably, one provides a concrete foundation 2 having an upper support surface 3. One preferably provides an elongated structural member 4 mounted in an upright orientation, the elongated structural member 4 having first and second sides 5 and a base 6. Preferably, one provides a unitary foundation connector 7 constructed from a sheet metal blank 8 of uniform thickness, the unitary foundation connector 7.

The connector 7 preferably has a base member 9 with horizontally separated first and second side edges 10 and horizontally separated first and second end borders 11. Preferably, the connector 7 has first and second end leg members 12 that are angularly joined to the first and second end borders 11 of the base member 9, respectively. The first and second end leg members 12 are preferably disposed in a generally upright orientation. Preferably, the first and second end leg members 12 each have horizontally separated substantially vertical first and second side leg extension borders 17. The connector 7 preferably has first and second end foot members 14 that are angularly joined to and splayed outward from the first and second end leg members 12, respectively, each of the first and second end foot members 14 having a lower surface 15. Preferably, the connector 7 has first and second side legs 18 angularly joined respectively to the first and second side leg extension borders 17 of the first end leg member 12 and disposed in a generally upright orientation. The connector 7 preferably has third and fourth side legs 18 that are angularly joined to the first and second side leg extension borders 17 of the second end leg member 12, respectively, and that are disposed in a generally upright orientation.

Preferably, the method includes sliding the unitary foundation connector 7 between the base 6 of the elongated structural member 4 and the upper support surface 3 of the concrete foundation 2 such that the base member 9 is disposed in registration with the base 6 of the elongated structural member 4. The lower surfaces 15 of the first and second end foot members 14 are preferably in registration with the upper support surface 3 of the concrete foundation. Preferably, the first, second, third and fourth side legs 18 are at least partially under the base member 9 between the base member 9 and the upper support surface 3 of the concrete foundation 2. The method preferably includes drilling a plurality of fastener holes 29 in the concrete foundation 2. Preferably, the method includes driving a plurality of anchoring fasteners 16 through the first and second end foot members 14 and into the fastener holes 29 in the concrete foundation 2 so that each of the first and second foot members 14 is fastened to the concrete foundation 2 with one or more separate anchoring fasteners 16.

If the elongated structural member 4, or post 4, rests directly on the upper support surface 3 of the concrete foundation 2, the lower portion of the post 4 can be cut off to create a slightly elevated post base 6 standoff the height of the connector 7. If this is necessary, the post 4 would be temporarily supported by post shims until the connector 7 is slipped into place.

The method preferably includes providing a unitary foundation connector 7 that has first and second post connection members 19. Preferably, the first and second post connection members 19 have first and second lower ends 20 angularly joined to the base member 9 along the first and second side edges 10, respectively. The first and second post connection members 19 are preferably disposed upwardly in registration with the first and second sides 5 of the elongated structural member 4, respectively. Preferably, the method includes fastening the first post connection member 19 to the first side 5 of the elongated structural member 4 one or more separate fasteners 28. The method preferably includes fastening the second post connection member 19 to the second side 5 of the elongated structural member 4 with one or more separate fasteners 28.

As shown in FIGS. 1-3, preferably each of the first and second end foot members 14 is fastened to the concrete foundation 2 with two anchoring fasteners 16. Each of the first and second post connection members 19 is preferably fastened to the elongated structural member 4 with two separate fasteners 28.

As shown in FIG. 3, preferably the separate fasteners 28 that fasten the first and second post connection members 19 to the elongated structural member 4 are two bolts 28 that interconnect the first and second post connection members 19 through the elongated structural member 4.

I claim:

1. A post to foundation connection (1) comprising:
   a. a concrete foundation (2) having an upper support surface (3);
   b. an elongated structural member (4) mounted in an upright orientation, the elongated structural member (4) having first and second sides (5) and a base (6);
   c. a unitary foundation connector (7) constructed from a sheet metal blank (8) of uniform thickness, the unitary foundation connector (7) including:
      i. a base member (9) disposed in registration with the base (6) of the elongated structural member (4), the base member (9) having horizontally separated first and second side edges (10) and horizontally separated first and second end borders (11);
      ii. first and second end leg members (12) angularly joined respectively to the first and second end borders (11) of the base member (9) and disposed in a generally upright orientation, the first and second end leg members (12) each having horizontally separated substantially vertical first and second side leg extension borders (17);
      iii. first and second end foot members (14) angularly joined to and splayed outward from the first and second end leg members (12), respectively, each of the first and second end foot members (14) having a lower surface (15) in registration with the upper support surface (3) of the concrete foundation and each of the first and second foot members (14) being fastened to the concrete foundation (2) with one or more separate anchoring fasteners (16);
      iv. first and second side legs (18) angularly joined respectively to the first and second side leg extension borders (17) of the first end leg member (12) and disposed in a generally upright orientation and at least partially under the base member (9) between the base member (9) and the upper support surface (3) of the concrete foundation (2);
      v. third and fourth side legs (18) angularly joined respectively to the first and second side leg extension borders (17) of the second end leg member (12) and disposed in a generally upright orientation and at least partially under the base member (9) between the base member (9) and the upper support surface (3) of the concrete foundation (2)
      vi. first and second post connection members (19) having first and second lower ends (20) respectively angularly joined to the base member (9) along the first and second side edges (10) and disposed upwardly in registration respectively with the first and second sides (5) of the elongated structural member (4) and fastened thereto.

2. The post to foundation connection (1) of claim 1 wherein:
   a. the first and second end leg members (12) are joined at right angles to the first and second end borders (11), respectively, of the base member (9);
   b. the first and second end foot members (14) are joined at right angles to the first and second end leg members (12), respectively;
   c. the first and second side legs (18) are joined at right angles to the first end leg members (12), respectively;
   d. the third and fourth side legs (18) are joined at right angles to the first and second side leg extension borders (17), respectively, of the second end leg member (12); and
   e. the first and second post connection members (19) are joined at right angles to the first and second side edges (10), respectively, of the base member (9).

3. The post to foundation connection (1) of claim 1 wherein:
   a. the first and second side legs (18) have first and second upper edges (21), respectively, and vertically separated first and second lower edges (22), respectively; and
   b. the third and fourth side legs (18) have third and fourth upper edges (21), respectively, and vertically separated third and fourth lower edges (22), respectively, wherein:
      i. the base member (9) is supported by the first and third upper edges (21), respectively, of the first and third side legs (18) adjacent the first lower end (20) of the first post connector (19); and
      ii. the base member (9) is supported by the second and fourth lower edges (21), respectively, of the second and fourth side legs (18) adjacent the second lower end (20) of the second post connector (19).

4. The post to foundation connection (1) of claim 3 wherein:
   a. the first and second lower edges (22) of the first and second side legs (18), respectively, bear on the upper support surface (3) of the concrete foundation (2); and
   b. the third and fourth lower edges (22) of the third and fourth side legs (18), respectively, bear on the upper support surface (3) of the concrete foundation (2).

5. The post to foundation connection (1) of claim 4 wherein:
   a. the first lower end (20) of the first side connection member (19) is connected to the base member (9) at a first lower end bend line (23) that is substantially parallel to the first and third upper edges (21), respectively, of the first and third side legs (18); and
   b. the second lower end (20) of the second side connection member (19) is connected to the base member (9) at a second lower bend line (23) that is substantially parallel to the second and fourth lower edges (21), respectively, of the second and fourth side legs (18).

6. The post to foundation connection (1) of claim 1 wherein:
   a. the first and second end leg members (12) are joined to the first and second end borders (11), respectively, of the base member (9) at first and second end leg bends (24), respectively;
   b. the first and second end foot members (14) are joined to the first and second inner foot border members (13), respectively, of the first and second end leg members (12) at first and second end foot bends (25), respectively;
   c. the first and second side legs (18) are joined to the first and second side leg extension borders (17), respectively, of the first end leg member (12) at first and second side leg bends (26), respectively;
   d. the third and fourth side legs (18) are joined at to the first and second side leg extension borders (17), respectively, of the second end leg member (12) at third and fourth side leg bends (26), respectively; and
   e. the first and second post connection members (19) are joined to the first and second side edges (10), respectively, of the base member (9) at first and second lower end bends (23), respectively.

7. The post to foundation connection (1) of claim 1 wherein:
   a. the first and second side connection members (19) are connected by one or more fasteners (28) that pass through the elongated structural member (4).

8. The post to foundation connection (1) of claim 1 wherein:
   a. the greater part of the base member (9) of the unitary foundation connector (7) is flat; and
   b. the base (6) of the elongated structural member (2) completely covers the flat part of the base member (9) of the unitary foundation connector (7).

9. The post to foundation connection (1) of claim 1 wherein:
   a. the greater part of the base member (9) of the unitary foundation connector (7) is flat and is not in registration with the upper support surface (3) of the concrete foundation (2).

10. The post to foundation connection (1) of claim 1 wherein:
    a. the first end foot member (14) has a first outer edge (13) horizontally separated from the second end border (11) of the base member (9);
    b. the second end foot member (14) has a second outer edge (13) horizontally separated from the second end border (11) of the base member (9);
    c. the first outer edge (13) of the first end foot member (14) is no longer than the distance between the first and second sides (5) of the elongated structural member; and
    d. the second outer edge (13) of the second end foot member (14) is no longer than the distance between the first and second sides (5) of the elongated structural member.

11. The post to foundation connection (1) of claim 1 wherein:
    a. each of the first and second end foot members (14) is fastened to the concrete foundation (2) with two anchoring fasteners (16).

12. A method of making a post to foundation connection (1) comprising the steps of:
    a. providing a concrete foundation (2) having an upper support surface (3);
    b. providing an elongated structural member (4) mounted in an upright orientation, the elongated structural member (4) having first and second sides (5) and a base (6); and
    c. providing a unitary foundation connector (7) constructed from a sheet metal blank (8) of uniform thickness, the unitary foundation connector (7) including:
        i. a base member (9) having horizontally separated first and second side edges (10) and horizontally separated first and second end borders (11);
        ii. first and second end leg members (12) angularly joined respectively to the first and second end borders (11) of the base member (9) and disposed in a generally upright orientation, the first and second end leg members (12) each having horizontally separated substantially vertical first and second side leg extension borders (17);
        iii. first and second end foot members (14) angularly joined to and splayed outward from the first and second end leg members (12), respectively, each of the first and second end foot members (14) having a lower surface (15);
        iv. first and second side legs (18) angularly joined respectively to the first and second side leg extension borders (17) of the first end leg member (12) and disposed in a generally upright orientation; and
        v. third and fourth side legs (18) angularly joined respectively to the first and second side leg extension borders (17) of the second end leg member (12) and disposed in a generally upright orientation;
    d. sliding the unitary foundation connector (7) between the base (6) of the elongated structural member (4) and the upper support surface (3) of the concrete foundation (2) such that the base member (9) is disposed in registration with the base (6) of the elongated structural member (4), the lower surfaces (15) of the first and second end foot members (14) are in registration with the upper support surface (3) of the concrete foundation, and the first, second, third and fourth side legs (18) are at least partially under the base member (9) between the base member (9) and the upper support surface (3) of the concrete foundation (2);
    e. drilling a plurality of fastener holes (29) in the concrete foundation (2);
    f. driving a plurality of anchoring fasteners (16) through the first and second end foot members (14) and into the fastener holes (29) in the concrete foundation (2) so that each of the first and second foot members (14) is fastened to the concrete foundation (2) with one or more separate anchoring fasteners (16)

g. providing the unitary foundation connector (7) has first and second post connection members (19) having first and second lower ends (20) respectively angularly joined to the base member (9) along the first and second side edges (10) and disposed upwardly in registration respectively with the first and second sides (5) of the elongated structural member (4);

h. fastening the first post connection member (19) to the first side (5) of the elongated structural member (4) with one or more separate fasteners (28); and i. fastening the second post connection member (19) to the second side (5) of the elongated structural member (4) with one or more separate fasteners (28).

13. The method of claim 12 wherein:

a. each of the first and second end foot members (14) is fastened to the concrete foundation (2) with two anchoring fasteners (16); and b. each of the first and second post connection members (19) is fastened to the elongated structural member (4) with two separate fasteners (28).

14. The method of claim 13 wherein:

a. the separate fasteners (28) that fasten the first and second post connection members (19) to the elongated structural member (4) are two bolts (28) that interconnect the first and second post connection members (19) through the elongated structural member (4).

\* \* \* \* \*